US012345399B2

(12) United States Patent
Piana, III

(10) Patent No.: US 12,345,399 B2
(45) Date of Patent: Jul. 1, 2025

(54) PLUGGABLE LOW VOLTAGE OUTDOOR WATERTIGHT LIGHTING SYSTEM FOR PATH LIGHTING

(71) Applicant: AQ Lighting Texas, Inc., Newhall, CA (US)

(72) Inventor: Thomas John Piana, III, Valencia, CA (US)

(73) Assignee: AQ LIGHTING TEXAS, INC., Newhall, CA (US)

( * ) Notice: Subject to any disclaimer, the term of this patent is extended or adjusted under 35 U.S.C. 154(b) by 124 days.

(21) Appl. No.: 18/510,241

(22) Filed: Nov. 15, 2023

(65) Prior Publication Data

US 2024/0159387 A1 May 16, 2024

Related U.S. Application Data

(60) Provisional application No. 63/425,485, filed on Nov. 15, 2022.

(51) Int. Cl.

*F21V 23/06* (2006.01)
*F21V 23/00* (2015.01)
*F21W 131/10* (2006.01)
*H01R 13/523* (2006.01)
*H01R 25/00* (2006.01)

(52) U.S. Cl.

CPC ............ *F21V 23/06* (2013.01); *F21V 23/001* (2013.01); *F21W 2131/10* (2013.01); *H01R 13/523* (2013.01); *H01R 25/003* (2013.01)

(58) Field of Classification Search

CPC ... F21V 23/06; F21V 23/001; F21W 2131/10; H01R 13/523; H01R 25/003

See application file for complete search history.

(56) References Cited

U.S. PATENT DOCUMENTS 8,436,846 B2 5/2013 Yamazaki et al.
8,975,647 B2 3/2015 Yamazaki
9,185,754 B2 * 11/2015 Huang ................. H05B 45/395
11,054,125 B1 * 7/2021 Chen ........................ F21V 23/06
11,333,311 B1 * 5/2022 Sorensen .................. F21S 2/00
11,346,537 B1 * 5/2022 Breedlove, Sr. ........ F21V 23/06
11,466,819 B2 * 10/2022 Brown .................... F21V 17/12

(Continued)

*Primary Examiner* — Adam D Houston

(74) *Attorney, Agent, or Firm* — Farber LLC; Fritz L. Schweitzer, III

(57) ABSTRACT

An outdoor lighting system has a low-voltage power supply connected to an A/C power source, an electrical power lead electrically connected to the power supply and having a second end with a modular electrical connector of a second type, an electrical extension cable with a modular electrical connector of the first type and a modular electrical connector of the second type, a branch connector with a base stem having a modular electrical connector of the first type and with a plurality of branch stems each having a modular electrical connector of the second type, and a light fixture having a modular electrical connector of the first type. Each modular connector of the first type being adapted to connect to any modular connector of the second type in a toolless manner to form a water-tight, submersible junction, and the lighting components can assemble toollessly in a large plurality of configurations.

3 Claims, 14 Drawing Sheets

(56) References Cited

U.S. PATENT DOCUMENTS

| | | | | |
|---|---|---|---|---|
| 2012/0194085 | A1* | 8/2012 | King | H05B 47/11 315/159 |
| 2014/0268781 | A1* | 9/2014 | Dau | F21V 23/06 362/249.06 |
| 2014/0292214 | A1* | 10/2014 | Huang | F21V 23/06 315/192 |
| 2015/0159844 | A1* | 6/2015 | Flaherty | F21S 4/10 362/249.02 |
| 2015/0159848 | A1* | 6/2015 | Sieberth | F21V 21/005 362/382 |
| 2015/0192285 | A1* | 7/2015 | Chen | F21S 4/10 315/185 R |
| 2017/0205036 | A1* | 7/2017 | Sorensen | F21V 15/01 |
| 2017/0276332 | A1* | 9/2017 | Pearson | F21V 21/005 |
| 2017/0292661 | A1* | 10/2017 | Moioli | F21S 2/005 |
| 2018/0003351 | A1* | 1/2018 | Van Winkle | F21V 23/001 |
| 2022/0057077 | A1* | 2/2022 | Kinsley | F21V 23/02 |
| 2024/0159387 | A1* | 5/2024 | Piana, III | F21V 23/001 |

* cited by examiner

PLUGGABLE LOW VOLTAGE OUTDOOR WATERTIGHT LIGHTING SYSTEM FOR PATH LIGHTING

FIELD OF THE INVENTION

The application relates to an outdoor lighting system, and more particularly to a pluggable lighting system that allows for the ease of installation and compensates for long electrical lighting runs.

BACKGROUND OF THE INVENTION

Outdoor lighting systems have traditionally required time-intensive installations. High quality systems have also typically been required to be installed by a licensed electrician. Additionally, the more lights on a lighting run, the longer it takes to perform the installation, as more connections are needed to be made for each light where each connection must be performed by a licensed electrician.

More recently, low-voltage lighting systems have become popular for outdoor lighting. These types of lighting systems typically use a DC voltage and do not need a licensed electrician to install. However, a problem these types of systems face is that they require substantial time and work to customize and install and it is often not safe or efficient for a non-licensed individual to install and modify the configuration of the lighting system.

Further, a problem these types of systems face is the issue of voltage drop for relatively long lighting runs, which can be particularly problematic for outdoor applications where such runs become common.

Voltage drop is a function of the resistance of the conductors that are connecting the electrical power to each lighting fixture. Voltage drop becomes a much more prevalent problem for low-voltage systems using DC voltage rather than AC voltage. In practice this means if a transformer is supplying a DC voltage, typically the first few fixtures will receive adequate voltage, but because of the loading on the circuit and wire resistance, the last few fixtures may not receive adequate voltage for the lighting fixtures to function properly.

SUMMARY OF THE INVENTION

Accordingly, what is needed is an outdoor lighting system that can reduce the time and work involved in the installation of a fully customizable outdoor lighting system using low voltage.

It is further desired to provide a system and method for quick and simple modification of an outdoor lighting system using low voltage where a non-licensed individual may safely and efficiently install and modify the configuration of the outdoor lighting system.

It is still further desired to provide a system and method that accommodates long runs of lights in an outdoor lighting system where the system is designed to transmit sufficient voltage to light fixtures positioned a relatively far distanced from the transformer.

The above objectives are achieved in one configuration with a No Splice Connection (NSC) lighting system. The system is particularly suitable for outdoor landscape and underwater lighting applications and is designed to be installed by the average homeowner. Homeowners considering landscape lighting can install the system with confidence, even if they do not have any prior knowledge of electrical systems. A system kit is provided which can be installed from the transformer to the final fixture with a series of plug-in, screw-tight, water-sealed connections of 12-gauge or 16-gauge leads, jumper cables, T-connectors, X-connectors, power cords, and reducers. It will be understood that wire gauges larger (or smaller) than 12 and 16 may be used if necessary. The system is IP68 rated, meaning it can be submerged underwater and carries the top rating for weatherproofing against harsh conditions. This allows a homeowner to install an entire landscape and underwater light system without owning or using a pair of wire strippers and save countless hours of labor through the simple, yet durable NSC system.

Voltage drop can be virtually eliminated using a combination of 12-gauge and 16-gauge wiring, and the reducers make that transition automatically. For existing lighting systems, the NSC system can be connected to the existing system. The NSC system retrofits with ease, and after the single splice, the entire system is a plug and screw-tight design.

The system is completely configurable to meet any need for lighting in an outdoor environment. Virtually any combination of jumper extension cables, power cables, T-connectors, X-connectors, and gauge reducing cables can be used by selecting desired size and quantity based on the number of lighting fixtures to be connected. Connection mistakes are eliminated using a polarity consistent 2-pin connection and secured via two metal retention nuts.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

Other objects of the invention and its features and advantages will become more apparent from consideration of the following drawings and accompanying detailed description.

DETAILED DESCRIPTION OF THE INVENTION

Figure 1:
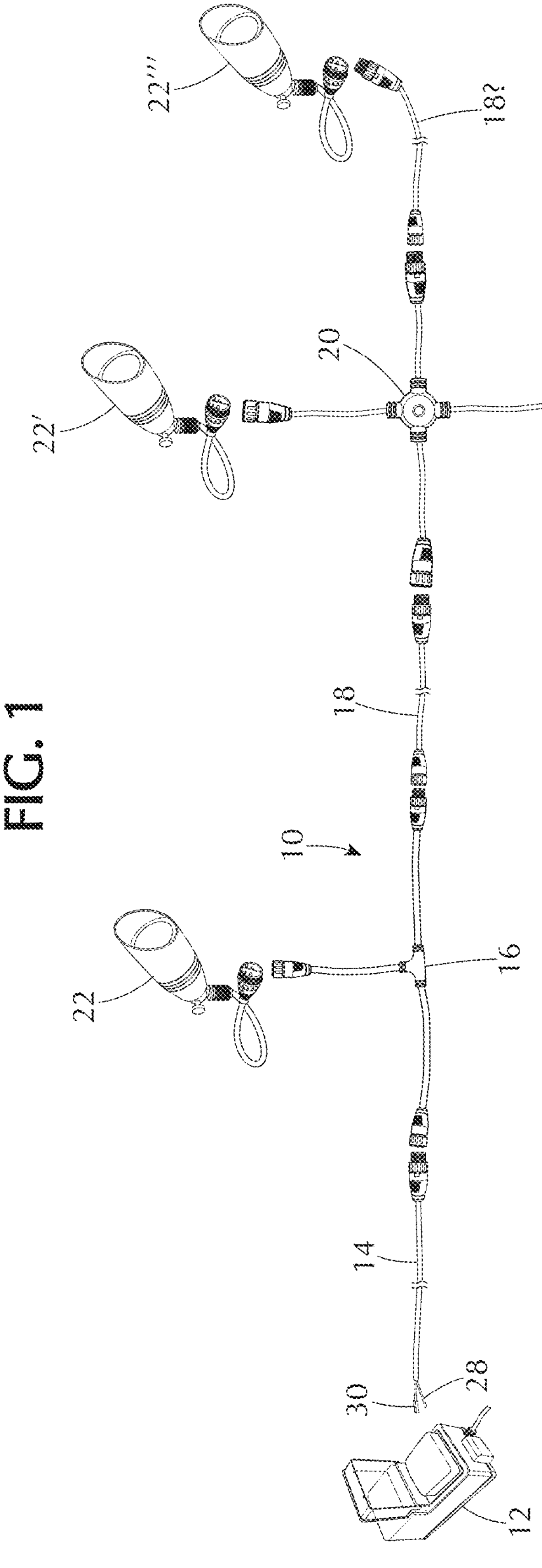
FIG. 1 is a diagram of one configuration of the lighting system according to the invention.

Referring to FIG. 1, the lighting system 10 can include a transformer 12, a power lead cable 14, a three-point branch connector 16, a plurality of extension cables 18, 18', a four-point branch connector 20, and a plurality of light fixtures 22, 22', 22", 22"', and can include other components as described herein.

The various components of the lighting system 10 preferably have at least one of two types of modular electrical connectors (i.e., of a first type and/or a second type) which are configured to connect in a convenient electrically and mechanically and toolless manner to form a secure and watertight junction. The modular electrical connectors are described in further detail below.

The various lighting components can be assembled in a large plurality of different configurations in a rapid manner and preferably without the use of tools. Many different configurations are possible and the configuration of FIG. 1 is merely provided to illustrate how the system can be quickly assembled using the plug connector system.

As an example, to set up the system, the user can determine a proper location for the transformer 12, layout the light fixtures 22, 22', 22" in their intended locations, measure the distance from the transformer 12 to the first light fixture 22 to determine and provide the required length of the power lead 14, measure the distance between each light fixture to determine provide the required lengths of the power extension cables 18, 18', layout a "T" or "X" branch connector as required for every light fixture 22, 22' except the terminal/last light fixture 22", interconnect the modular connectors of all of the components to form junctions, connect the power lead to the transformer and the first component in the system (e.g., T connector as shown), connect the transformer to the power source (e.g., A/C power), test all of the lights, and lastly finalize the positions of the components, which may include burying and/or submerging some or all of the components and/or junctions.

Figure 2:
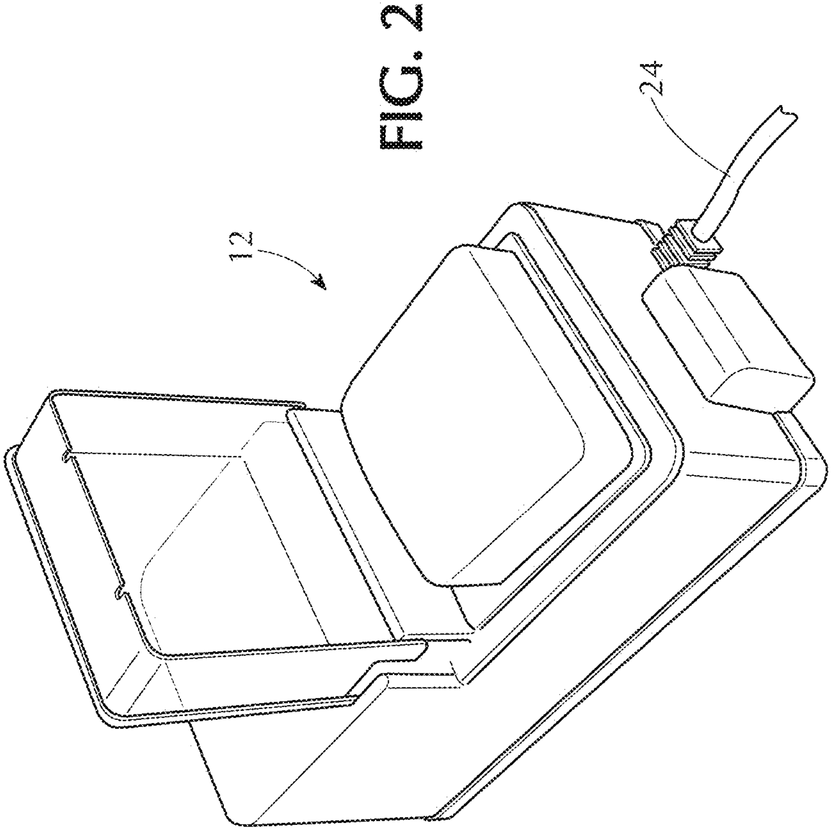
FIG. 2 is an illustration of a transformer of the lighting system according to FIG. 1.

Referring to FIG. 2, the transformer 12 of the lighting system is configured to provide power to the system. For example, the transformer may be a rectifier adapted to convert AC voltage to low-voltage DC (e.g., 12V-48V). An input of the rectifier may be connected to a 120-volt AC power source (not shown) by plugging a power connector cord 24 into a standard (e.g., GFCI) outlet on the exterior of a building. It is intended that the transformer 12 be placed above ground/water.

Figure 3:
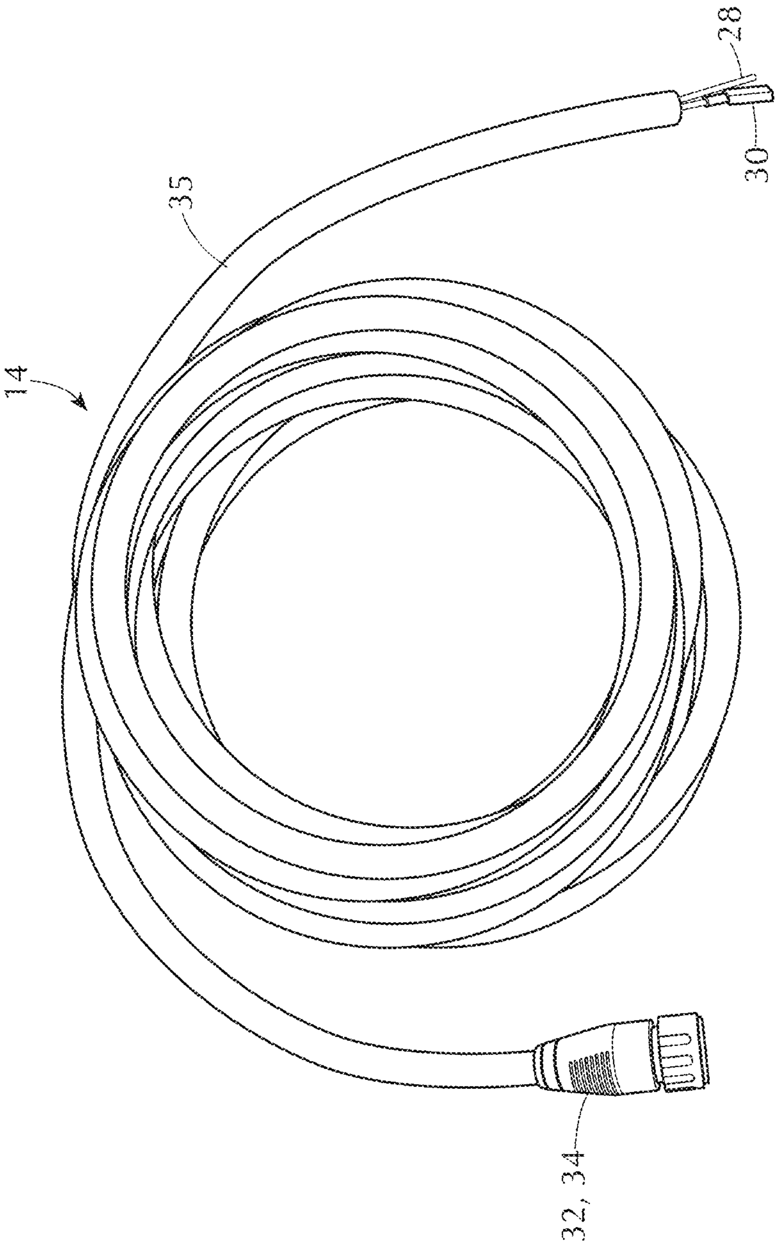
FIG. 3 is an illustration of a power lead cable used in the lighting system according to FIG. 1.

Referring to FIG. 3, the power lead cable 14 of the lighting system 10 is operable to connect any of the various other components of the lighting system described herein to the transformer 12. The power lead cable 16 preferably has a pair of conductors 28, 30 which span from a first end 26 to a second end 32 of the power lead cable. Free ends of the conductors 28, 30 can extend outwardly from the first end 26 and can pre-stripped or otherwise adapted to connect to the transformer 12, such as to a pair of positive and negative terminal blocks (not shown) on the transformer 12. The second end 32 of the power lead cable 16 preferably has a modular electrical connector 34 of the aforementioned second type.

The conductors 28, 30 of the power lead cable 14 preferably comprise 14-gauge or 12-gauge wire (or a lower or higher gauge wire such as 10-gauge or 8-gauge may also be used). The power lead cable 14 may be designed for a range of low voltage levels, for example 12/24 volt AC/DC power, and may be provided in various lengths (e.g., 15 feet). Further, the conductors 28, 30 are preferably enclosed in a water-proof sheath 35, and the power lead cable 14 and the modular connector 34 thereof are preferably IP68 rated.

Figure 4:
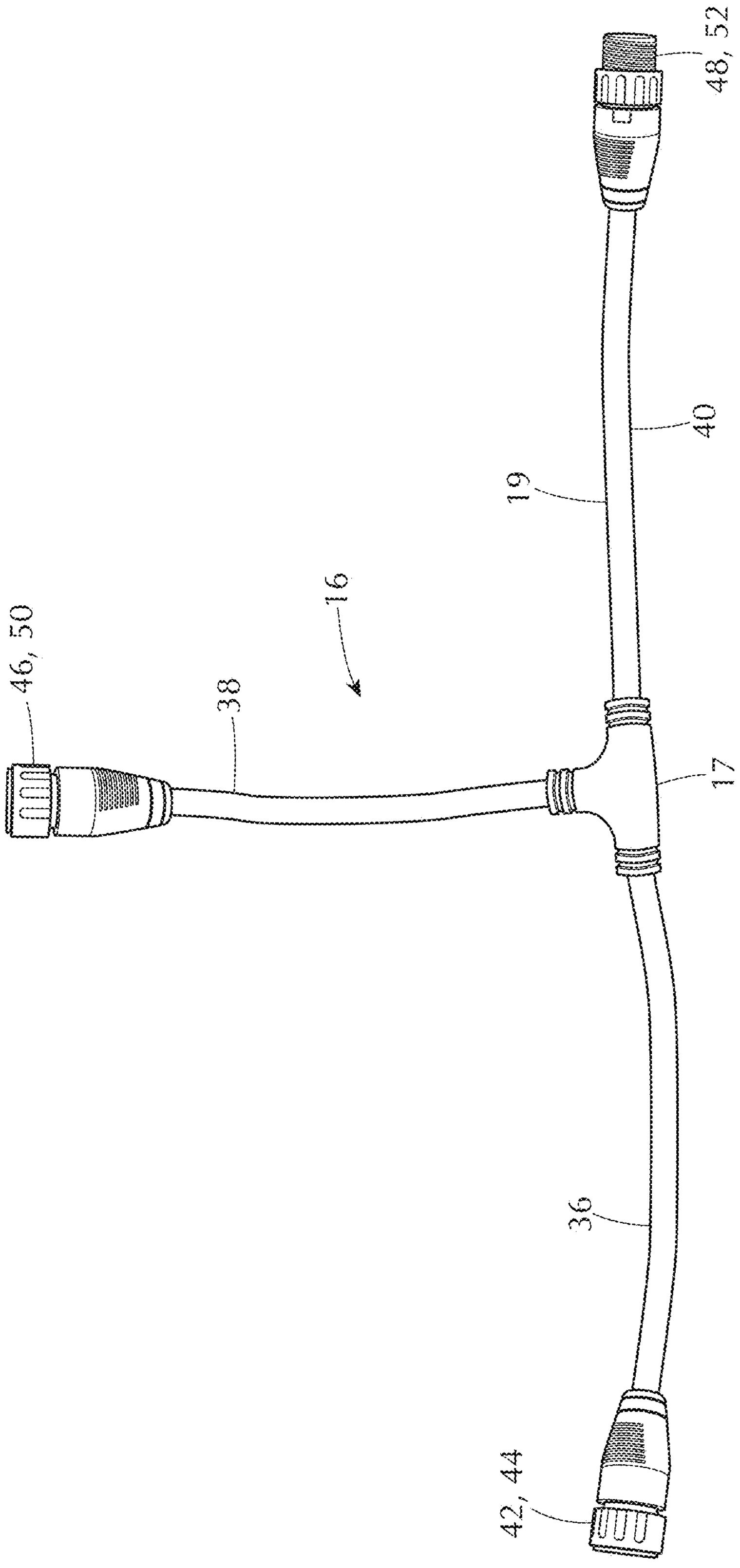
FIG. 4 is an illustration of a three-point "T" branch connector of the lighting system according to FIG. 1.

Referring to FIG. 4, the three-point branch connector 16 of the lighting system 10 may be in the form of a "T" having a base stem 36 and two branch stems 38, 40 extending from the base. Each of the base stem 26 and branch stems 38,40 preferably have a pair of conductors (not shown) encased in a water-proof sheath 19, and the conductors of each of the branch stems 38, 40 are preferably electrically connected to conductors of the base stem 36 in parallel, for example within a hub 17 of the connector 16. The base stem 36 preferably has a free end 42 with a modular electrical connector 44 of the first type and each of the branch stems 38, 40 preferably has an end 46, 48 with an electrical connector 50, 52 of the second type.

The three-point ("T") branch connector 16 allows for connection of lighting fixtures to power and/or for continuation of the lighting run to the next light fixture or other component of the system. The three-point "T" branch connector 16 provides one modular connector of the first type and two modular connectors of the second type, all of which are preferably IP68 rated and polarity consistent, and may be used in underwater and in-ground lighting applications.

This three-point branch connector 16 can be designed for 12/24-volt AC/DC, and can comprise either 12-gauge wire (or a higher gauge wire such as 10-gauge or 8-gauge may also be used) or 16-gauge wire (a higher gauge wire such as 14-gauge or 12-gauge may also be used), and is preferably IP68 rated.

Figure 5:
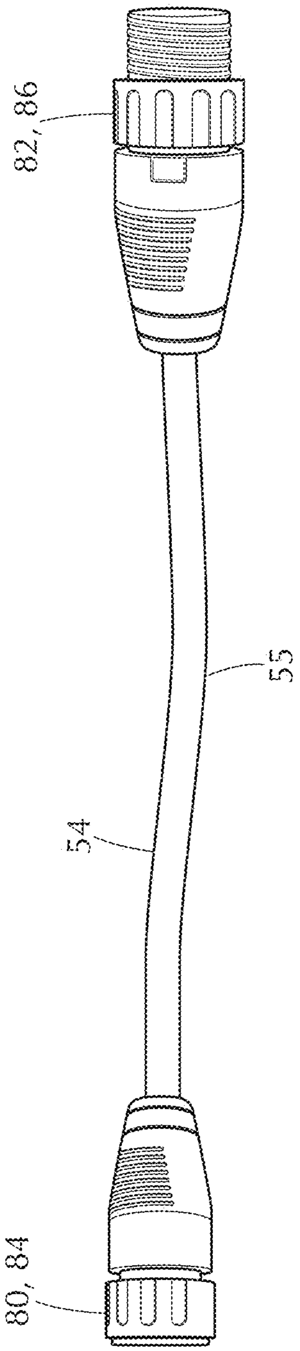
FIG. 5 is an illustration of a conductor gauge reducer of the lighting system according to FIG. 1.

Referring to FIG. 5, the system can include a gauge reducer connector cable 54 which is adapted to interconnect cables or components of the system having differing gauge wiring. For example, the gauge reducer connector 54 can be a 12 Gauge to 16 Gauge Reducer. The reducer allows for adapting, in this instance, from system components having 12-gauge conductors down to components having 16-gauge conductors. As an example, on a first end 80 the reducing connector 54 can include a M25 (12 Gauge) modular connector 84 of one of the first or second type, and can include a M16 (16 Gauge) modular connector 86 of the other of the first and second type on a second end 82. As an example, the gauge reducer connector can be relatively short at about 10.5 inches long and can include a pair of 16-gauge conductors between the modular connectors. Using a polarity consistent 2-pin connection and secured via two metal retention nuts, the reducing connector is preferably IP68 rated.

The gauge reducer connector cable 54 preferably has a pair of conductors (not shown) which can be designed for 12/24-volt AC/DC, and can comprise either 12-gauge wire (a higher gauge wire such as 10-gauge or 8-gauge may also be used) or 16-gauge wire (a higher gauge wire such as 14-gauge or 12-gauge may also be used). The conductors of the gauge reducer cable 54 are preferably encased in a water-proof sheath 55 such that the gauge reducer 54 and the modular connectors thereof are IP68 rated.

Figure 6:
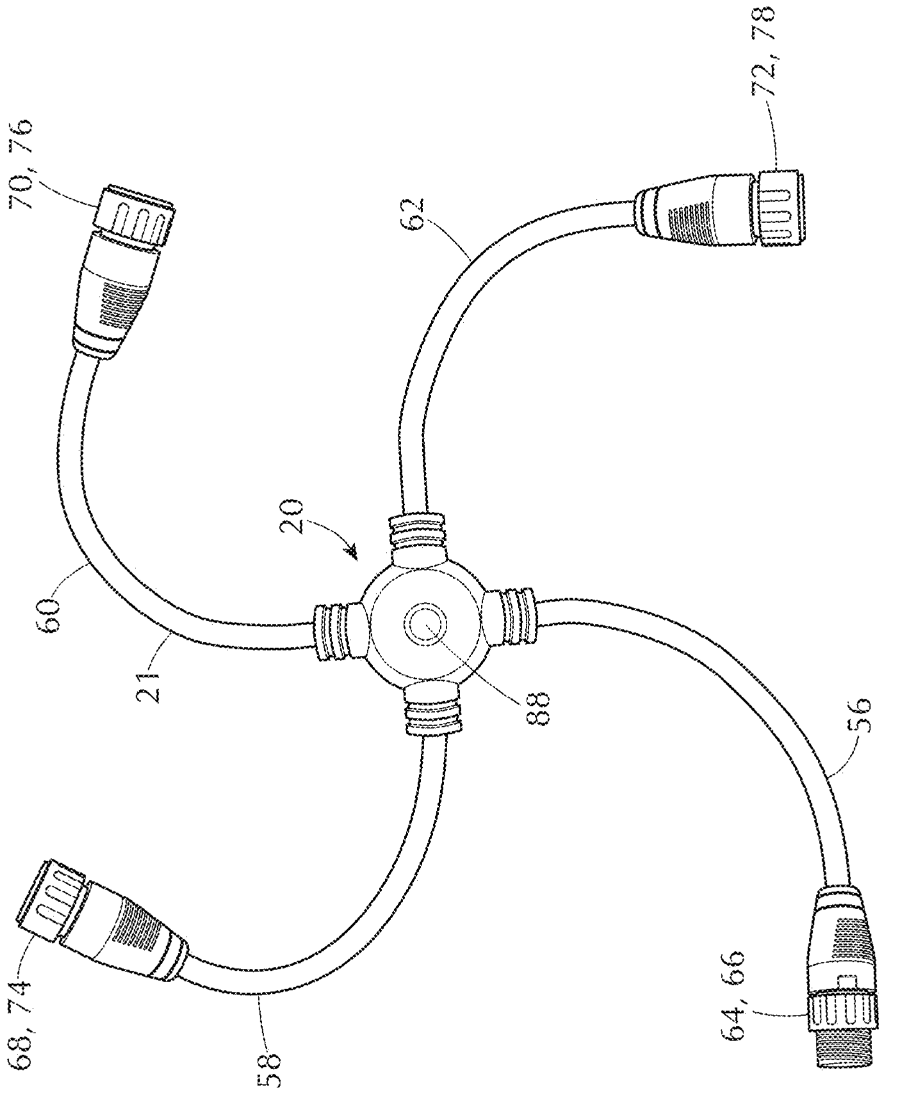
FIG. 6 is an illustration of a four-point "X" branch connector of the lighting system according to FIG. 1.

Referring to FIG. 6, the four-point branch connector 20 of the lighting system 10 may be in the form of a "X" having a base stem 56 and three branch stems 58, 60, 62 extending from the base. Each of the base stem 56 and branch stems 58, 60, 62 preferably have a pair of conductors (not shown) encased in a water-proof sheath 21, and the conductors of each of the branch stems 58, 60, 62 are preferably electrically connected to conductors of the base stem 56 in parallel, for example within a hub 88 of the connector 20. The base stem 56 preferably has a free end 64 with a modular electrical connector 66 of the first type and each of the branch stems 58, 60, 62 preferably have an end 68, 70, 72 with an electrical connector 74, 76, 78 of the second type.

The four-point ("X") branch connector 20 allows for connection of lighting fixtures to power and/or for continuation of the lighting run to the next light fixture or other component of the system. The four-point "X" branch connector 20 provides one modular connector of the first type and three modular connectors of the second type, all of which are preferably IP68 rated and polarity consistent, and may be used in underwater and in ground lighting applications.

The four-point branch connector 20 can be designed for 12/24-volt AC/DC, and can comprise either 12-gauge wire (or a higher gauge wire such as 10-gauge or 8-gauge may also be used) or 16-gauge wire (a higher gauge wire such as 14-gauge or 12-gauge may also be used), and is preferably IP68 rated.

Figure 7:
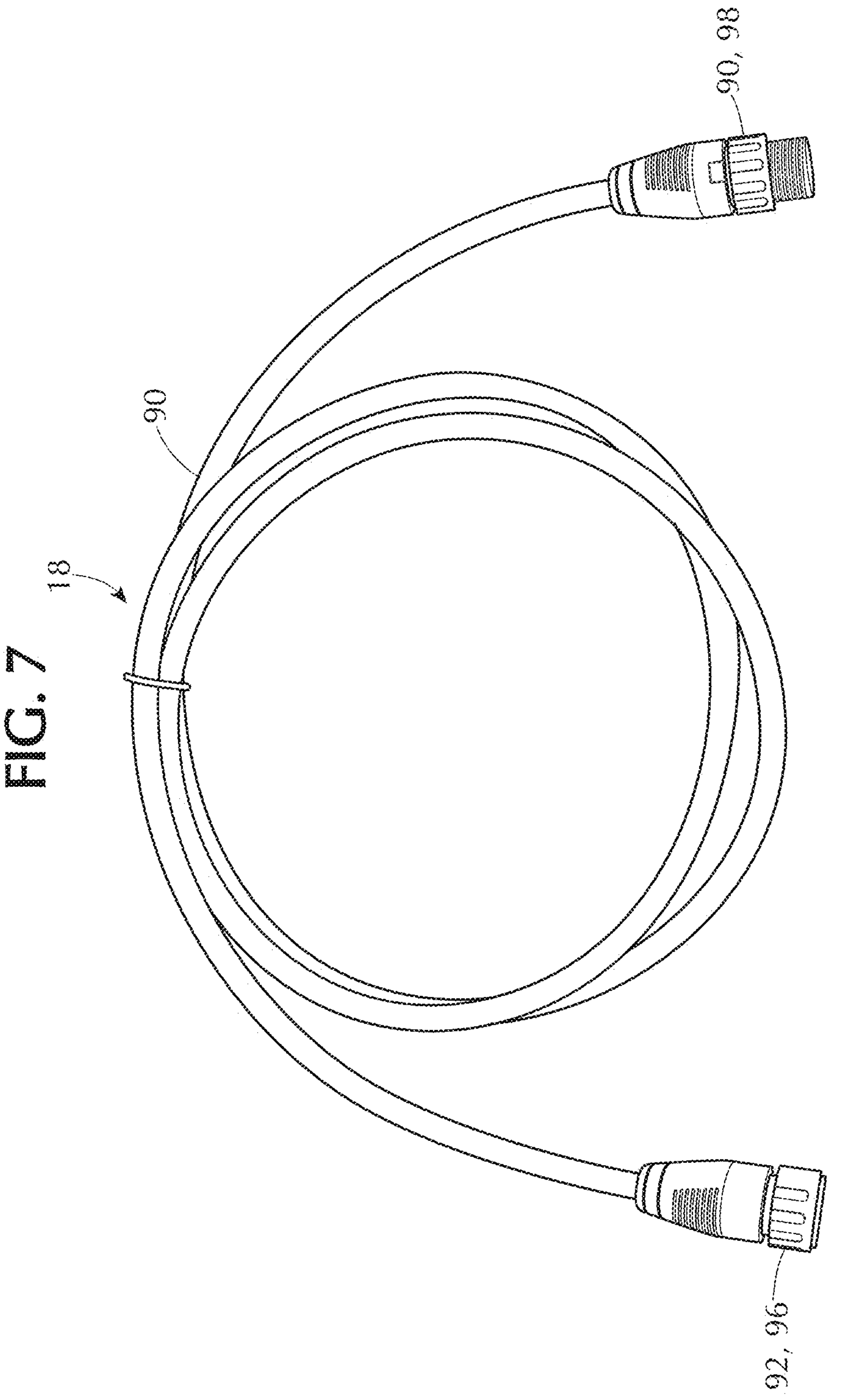
FIG. 7 is an illustration of an extension cable used in the lighting system according to FIG. 1.

Referring to FIG. 7, the extension cable 18 is preferably operable to connect to, and/or interconnect, any of the various other components of the lighting system described herein including power lead 14, branch connectors 16, 20, light fixtures 22, other extension cables 18, and other components of the system.

The extension cable 18 has a first end 92 with a modular connector 96 of the first type and has a second end 94 with a modular connector 98 of the second type. The extension cable 18 preferably has a pair of conductors (not shown) which can be designed for 12/24-volt AC/DC, and can comprise either 12-gauge wire (a higher gauge wire such as 10-gauge or 8-gauge may also be used) or 16-gauge wire (a higher gauge wire such as 14-gauge or 12-gauge may also be used). The conductors of the extension cable 18 are preferably encased in a water-proof sheath 90 such that the extension cable 18 and the modular connectors thereof are IP68 rated.

Figure 8:
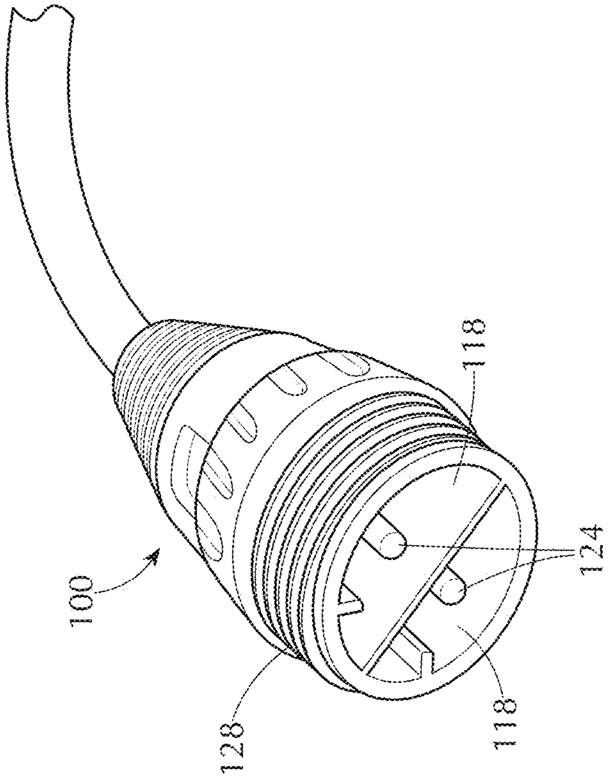
FIG. 8 is an illustration of a modular electrical connector of a first type of the lighting system according to FIG. 1.
Figure 9:
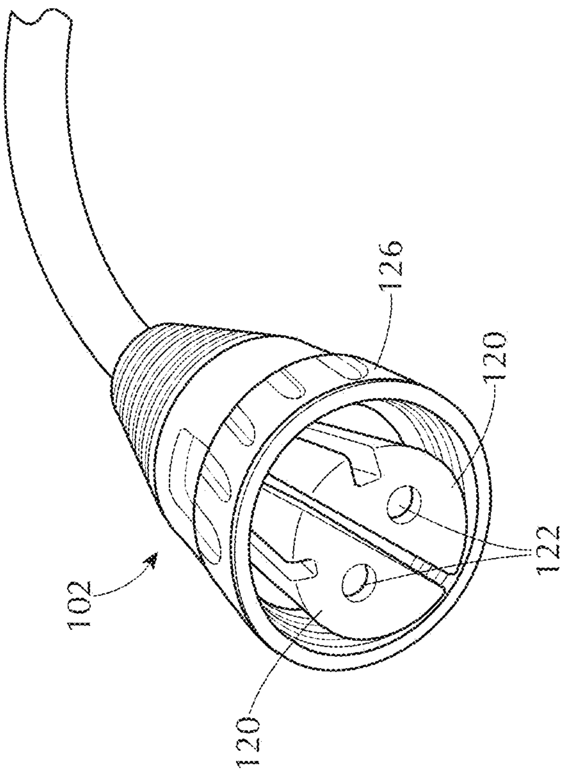
FIG. 9 is an illustration of a modular electrical connector of a second type of the lighting system according to FIG. 1.
Figure 10:
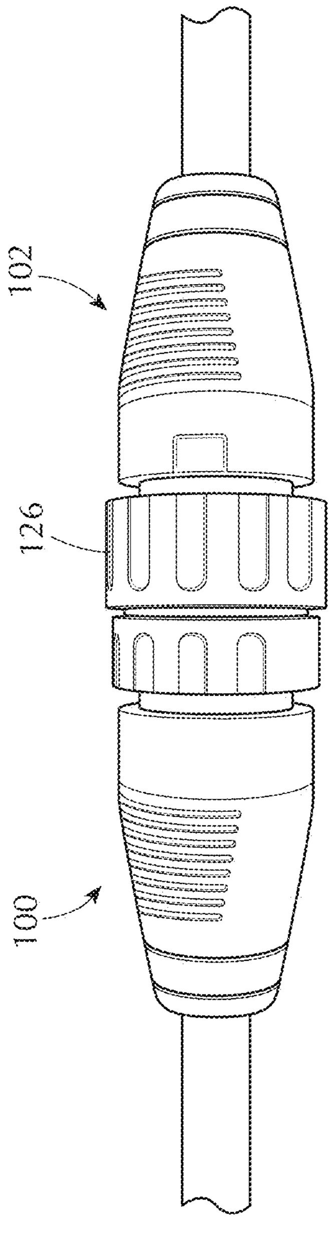
FIG. 10 is an illustration of modular electrical connectors of the first and second types connected and forming a watertight junction used in the lighting system according to FIG. 1.

Referring to FIGS. 8-10, the first type of modular connector 100 (FIG. 8) is configured and adapted to toollessly electrically and mechanically connect to the second type of modular connector 102 (FIG. 9). FIG. 8 is a view of the (female) 2-pin connector of the modular connector of the first type 100, as is used in the system that is IP68 rated. FIG. 9 is a view of the (male) 2-socket connector of the modular connector of the second type 102, as is used in the system which is also IP68 rated.

The modular connector of the first type 100 can include one or more sockets 118 configured to receive correspondingly configured projections 120 of the modular connector of the second type 102, which projections can include a pin socket 122 configured and adapted to receive the pins 124 of the connector of the first type 100.

The modular connector of the second type 102 can include an internally threaded, rotatable connection ring 126 which is adapted to threadingly engage external threads 128 on the modular connector of the first type 100.

FIG. 10 is a view of the first connector 100 of FIG. 8 mechanically and electrically connected with the second connector 102 of FIG. 9 forming a watertight sealed junction or connection, wherein the projections 120 are received within the sockets 118 and pins 124 are received within the pin sockets 122 and the connection ring 126 of the second modular connector is fully threaded onto the external threads 128 of the first modular connector.

Any modular connector of the first type 100 of any component in the system 10 can be connected to any (and can only be connected to a) modular connector of the second type 102. Therefore, the system provides for various configurations of components.

As can be appreciated, the water-tight, IP68 rated junctions and interconnections formed by the modular connectors and the remainder of the system components provides a IP68 rated system along the full length of the system, including at least from the first junction, between the power lead cable 14 and the first component of the system 10, to the last junction, between the last and second-to-last components of the system 10. Further, such IP68 rated system can be assembled and installed rapidly and without the use of tools.

Figure 11A:
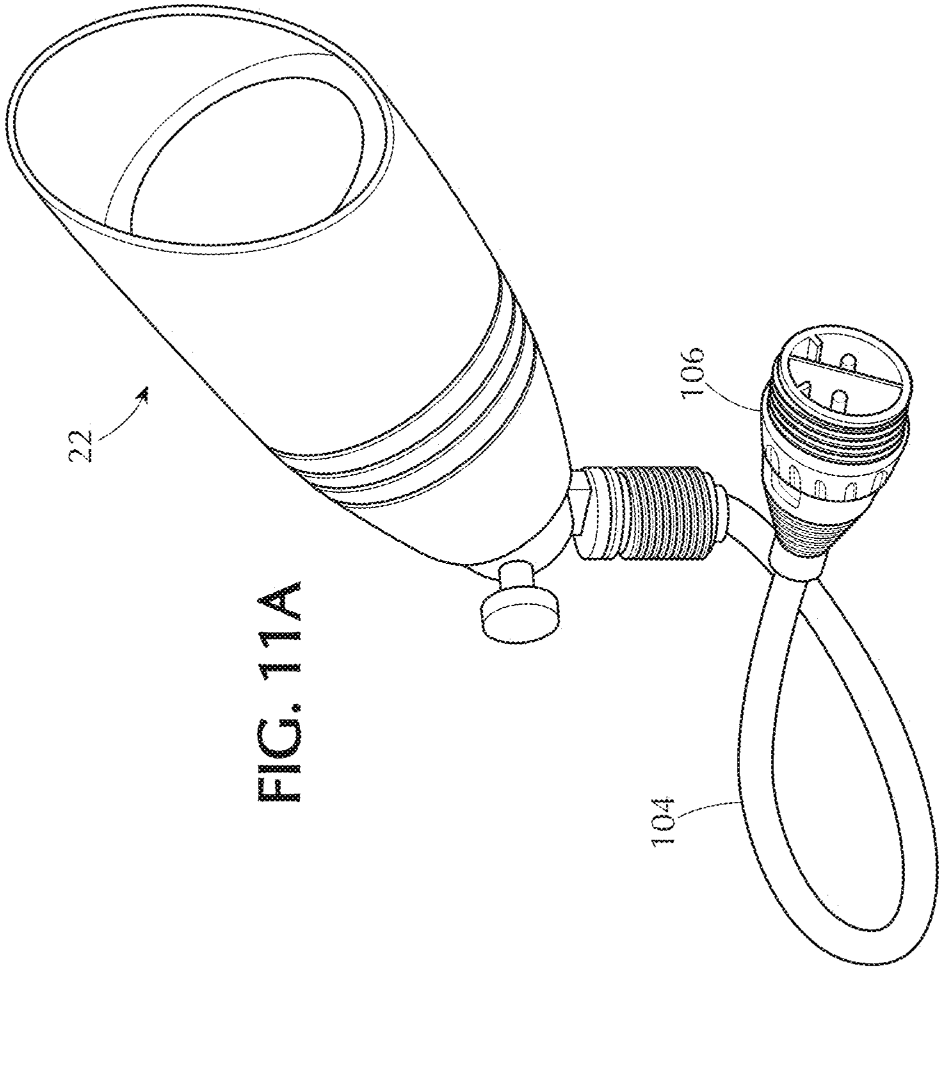
FIG. 11A is an illustration of a pluggable light fixture of the lighting system according to FIG. 1.

Referring to FIG. 11A, the light fixture 22 of the system has a power cord 104 having a modular connector of the first type 106 that can be connected to the system.

Figure 11B:
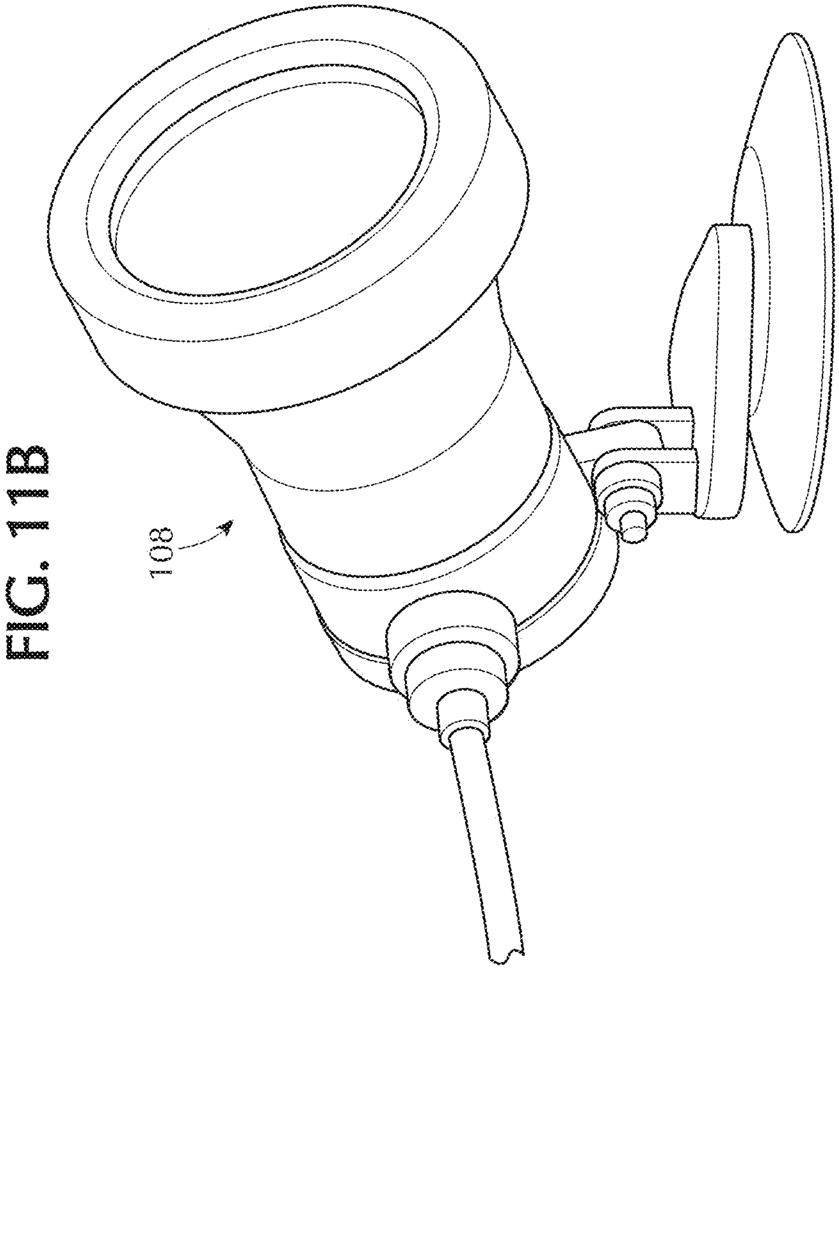
FIG. 11B is an illustration of a full color LED pluggable light fixture used in the lighting system according to FIG. 1.

Referring to FIG. 11B, the system can also include various types of light fixtures, including a programmable multi-color LED light 108 that allows for programming of the light to virtually any color desired.

Figure 12:
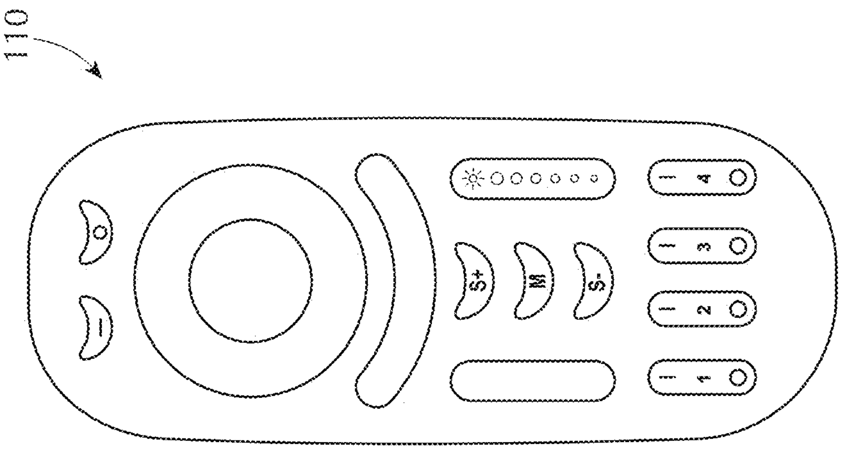
FIG. 12 is an illustration of a controller that can be used with a full color LED pluggable light fixture according to FIG. 11B.

Referring to FIG. 12, the system can include a hand-held controller 110 that can be used to control and/or program the light fixture of FIG. 11B. It is contemplated that virtually any color can be selected for any of the individual light fixtures. Additionally, the brightness of each individual light fixture on a run can be individually set, and a time can be programmed for each individual light fixture to be run a program can be individually set. For example, a first light fixture may be programmed to run a first program including, color, brightness, and effect (solid on, on/off, as well as a time for frequency of the on/off and so on), whereas a second light fixture could run a second separate program. It is contemplated that each light fixture can be individually programmed. It will be appreciated by those of skill in the art that the programming of these light fixtures may further be accomplished via a network connection to a computer.

Figure 13:
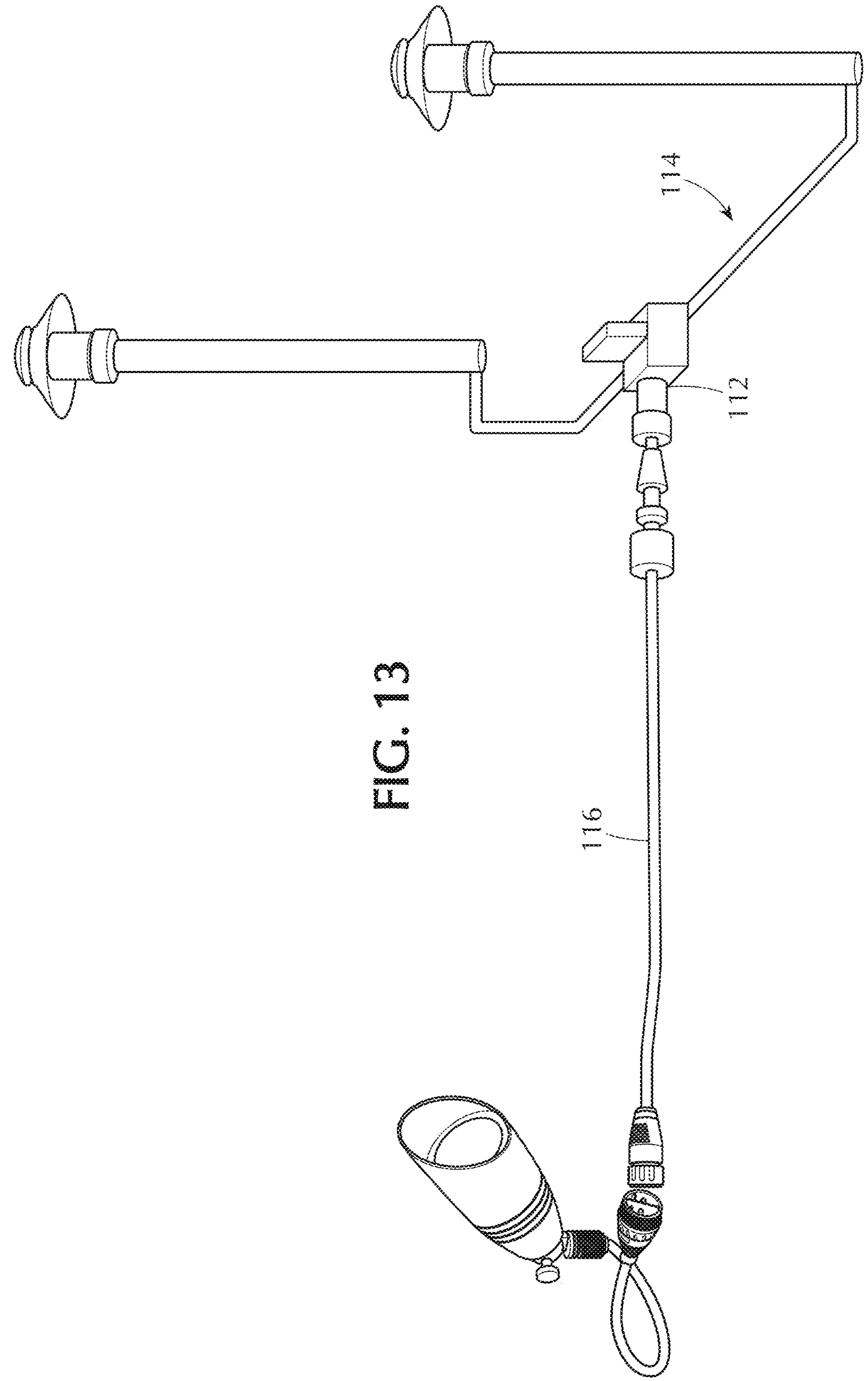
FIG. 13 is an illustration of a retrofit adapter diagram that shows how the lighting system can be retrofit with an existing low voltage lighting system.

Referring to FIG. 13 the system can include a retrofit adapter 112 which allows for retrofitting of the system 10 to an existing light system 114. A retrofit power connector 116 is used to connect to the retrofit adapter 112 to connect to an existing light fixture(s). Once the retrofit adapter 112 is connected to the existing lighting system 114, the connection system 10 may be used to extend the lighting system through the quick connection system as illustrated in FIGS.

8-10. For example, in this instance, a 12-gauge wire retrofit adapter 112 may be used and a new run may be installed connected to the end of the existing system. The run may be quite lengthy such that the new light fixtures are located relatively far from the existing system. In that case, the 12-gauge system may be used to extend the power to the new location, at which point it could be scaled down to 16-gauge to feed the new light fixtures. It is contemplated the virtually any configuration can be used with the retrofit system.

Although the invention has been described with reference to a particular arrangement of parts, features and the like, these are not intended to exhaust all possible arrangements or features, and indeed many other modifications and variations will be ascertainable to those of skill in the art.

The foregoing examples are presented to further illustrate and explain the present invention and should not be taken as limiting in any regard. Likewise, the illustrations and drawings are not provided to scale and are provided to further explain and illustrate the novel features of the invention.

What is claimed:

1. An outdoor lighting system, comprising:

a low-voltage D/C power supply operable to connect to an A/C power source;

a plurality of lighting components each having at least one of a modular electrical connector of a first type or a second type, and the plurality of lighting components including at least one each of:

(a) an electrical power lead having a first end operable to electrically connect to the power supply, and having a second end with a modular electrical connector of the second type;

(b) an electrical extension cable having a first end with a modular electrical connector of the first type and a second end with a modular electrical connector of the second type;

(c) a branch connector having a base stem with a modular electrical connector of the first type and having a plurality of branch stems each having a modular electrical connector of the second type, and each of the branch stems being electrically connected to the base stem in parallel; and (d) a light fixture having a modular electrical connector of the first type and having a light emitting element; and each modular electrical connector of the first type being adapted to electrically and mechanically connect to any modular electrical connector of the second type in a toolless manner to form a junction, and each junction being water-tight and submersible;

whereby the lighting components of the outdoor lighting system can assemble rapidly without the use of tools and can be arranged in a large plurality of configurations.

2. A kit for an outdoor lighting system, comprising:

a low-voltage D/C power supply operable to connect to an A/C power source;

a plurality of lighting components each having at least one of a modular electrical connector of a first type or a second type, and the plurality of lighting components including at least one each of:

(a) an electrical power lead having a first end operable to electrically connect to the power supply, and having a second end with a modular electrical connector of the second type;

(b) an electrical extension cable having a first end with a modular electrical connector of the first type and a second end with a modular electrical connector of the second type;

(c) a branch connector having a base stem with a modular electrical connector of the first type and having a plurality of branch stems each having a modular electrical connector of the second type, and each of the branch stems being electrically connected to the base stem in parallel; and (d) a light fixture having a modular electrical connector of the first type and having a light emitting element; and each modular electrical connector of the first type being adapted to electrically and mechanically connect to any modular electrical connector of the second type in a toolless manner to form a junction, and each junction being water-tight and submersible;

whereby the lighting components of the outdoor lighting system can assemble rapidly without the use of tools and can be arranged in a large plurality of configurations.

3. A method of installing an outdoor lighting system, comprising:

providing a low-voltage D/C power supply operable to connect to an A/C power source;

providing a plurality of lighting components each having at least one of a modular electrical connector of a first type or a second type, and the plurality of lighting components including at least one each of:

(a) an electrical power lead having a first end operable to electrically connect to the power supply, and having a second end with a modular electrical connector of the second type;

(b) an electrical extension cable having a first end with a modular electrical connector of the first type and a second end with a modular electrical connector of the second type;

(c) a branch connector having a base stem with a modular electrical connector of the first type and having a plurality of branch stems each having a modular electrical connector of the second type, and each of the branch stems being electrically connected to the base stem in parallel; and (d) a light fixture having a modular electrical connector of the first type and having a light emitting element; and each modular electrical connector of the first type being adapted to electrically and mechanically connect to any modular electrical connector of the second type in a toolless manner to form a junction, and each junction being water-tight and submersible;

connecting the first end of the electrical power lead to the power supply;

connecting the electrical extension cable to the electrical power lead by toollessly connecting the modular electrical connector of the first type on the first end of the electrical extension cable to the modular electrical connector of the second type of the second end of the electrical power lead, thereby forming a water-tight junction;

connecting the branch connector to the electrical extension cable by toollessly connecting the modular electrical connector of the first type on the base branch of the branch connector to the modular electrical connector of the second type on the second end of electrical extension cable, thereby forming a water-tight junction;

connecting the light fixture to the branch connector by toollessly connecting the modular electrical connector of the first type of the light fixture to the modular electrical connector of the second type of one of the plurality of stem branches of the branch connector, thereby forming a water-tight junction; and connecting the power supply to the A/C power source;

whereby the lighting components of the outdoor lighting system are assembled rapidly without the use of tools.

* * * * *